(12) United States Patent
Abdullah Abdo

(10) Patent No.: US 12,091,329 B1
(45) Date of Patent: Sep. 17, 2024

(54) WATER DESALINATION BY USING COMPACT AND PORTABLE SOLAR STILL WITH HIGH EFFICIENCY

(71) Applicant: KING SAUD UNIVERSITY, Riyadh (SA)

(72) Inventor: Basem Motea Abdullah Abdo, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/373,691

(22) Filed: Sep. 27, 2023

(51) Int. Cl.
 *C02F 1/14* (2023.01)
 *B01D 1/00* (2006.01)
 (Continued)

(52) U.S. Cl.
 CPC .............. *C02F 1/14* (2013.01); *B01D 1/0035* (2013.01); *B01D 1/04* (2013.01); *B01D 3/02* (2013.01); *B01D 5/006* (2013.01); *B01D 5/009* (2013.01); *C02F 1/043* (2013.01); *C02F 1/18* (2013.01); *C02F 2103/08* (2013.01); *C02F 2201/008* (2013.01); *C02F 2201/009* (2013.01)

(58) Field of Classification Search
 CPC ... C02F 1/043; C02F 1/14; C02F 1/18; B01D 1/0035; B01D 1/04; B01D 3/02; B01D 5/006; B01D 5/009
 See application file for complete search history.

(56) References Cited

U.S. PATENT DOCUMENTS 3,159,554 A * 12/1964 Mount ............... C02F 1/14
 159/DIG. 42
4,003,365 A * 1/1977 Wiegand ............ F24S 80/525
 126/621
(Continued)

FOREIGN PATENT DOCUMENTS

| CN | 106064840 B | * | 1/2019 | ............... C02F 1/14 |
| GB | 2345002 A | * | 6/2000 | ............... C02F 1/14 |

OTHER PUBLICATIONS

Obai Younis, et al., "Comprehensive Review on Solar Stills-Latest Developments and Overview", Sustainability 2022, 14, 10136, pp. 1-59. First available online Aug. 16, 2022.

(Continued)

*Primary Examiner* — Jonathan Miller
(74) *Attorney, Agent, or Firm* — Nath, Goldberg & Meyer; Joshua B. Goldberg

(57) ABSTRACT

A method for desalinating a saline or a brackish water includes filling an inner portion of a basin with the saline or the brackish water to saturate a second sponge. Adjusting a rear reflective mirror to reflect an incident solar radiation onto a serpentine pipe. Adjusting a top double sided reflective mirror to reflect the incident solar radiation through a front surface of a glass cover and onto a water tank. Adjusting a front reflective mirror, a right reflective mirror, and a left reflective mirror to reflect the incident solar radiation through the glass cover. A temperature rise inside the basin causes the saline or the brackish water to become heated and vaporized into water vapor. Condensing the water vapor to form distilled water droplets which are collected in a plurality of troughs as distilled water. Flowing the distilled water from the plurality of troughs to a storage tank.

20 Claims, 11 Drawing Sheets

(51) Int. Cl.
*B01D 1/04* (2006.01)
*B01D 3/02* (2006.01)
*B01D 5/00* (2006.01)
*C02F 1/04* (2023.01)
*C02F 1/18* (2023.01)
*C02F 103/08* (2006.01)

(56) References Cited

U.S. PATENT DOCUMENTS

| | | | | | |
|---|---|---|---|---|---|
| 4,227,970 | A | * | 10/1980 | Howell, Jr. | C02F 1/14 202/266 |
| 4,235,679 | A | * | 11/1980 | Swaidan | B01D 5/0066 203/DIG. 1 |
| 4,323,052 | A | * | 4/1982 | Stark | C02F 1/14 136/246 |
| 4,469,938 | A | * | 9/1984 | Cohen | G01S 3/7861 126/696 |
| 4,487,659 | A | * | 12/1984 | Stark | C02F 1/14 202/202 |
| 5,053,110 | A | * | 10/1991 | Deutsch | C02F 1/14 203/1 |
| 5,628,879 | A | * | 5/1997 | Woodruff | C02F 1/14 203/DIG. 1 |
| 6,767,433 | B2 | * | 7/2004 | Foster | C02F 1/14 220/560.08 |
| 6,821,395 | B1 | * | 11/2004 | Ward | C02F 1/14 203/DIG. 1 |
| 7,153,395 | B2 | * | 12/2006 | Foster | C02F 1/14 203/DIG. 1 |
| 8,083,902 | B2 | * | 12/2011 | Al-Garni | B01D 5/006 165/146 |
| 9,187,341 | B2 | * | 11/2015 | Kerschgens | B01D 1/221 |
| 9,908,790 | B2 | * | 3/2018 | Maiti | B01D 1/0035 |
| 10,183,233 | B1 | * | 1/2019 | Haidar | B01D 3/008 |
| 10,233,095 | B1 | * | 3/2019 | Haidar | B01D 1/0035 |
| 10,329,167 | B2 | * | 6/2019 | Calene | B01D 5/0075 |
| 10,898,825 | B2 | * | 1/2021 | McClean | B01D 1/0035 |
| 10,981,805 | B2 | * | 4/2021 | Armstrong | B01D 1/22 |
| 11,639,297 | B1 | * | 5/2023 | Alnaimat | C02F 1/265 210/748.16 |
| 2015/0107983 | A1 | | 4/2015 | Maiti et al. | |

OTHER PUBLICATIONS

T.V. Arjunan, et al., "The effect of sponge liner on the performance of simple solar still", International Journal of Renewable Energy Technology, vol. 2, No. 2, pp. 169-192. First available online Apr. 1, 2011.

Hayder Azeez Neamah Diabil, "Experimental study to enhance the productivity of single-slope single-basin solar still", Open Engineering, vol. 12, No. 1, pp. 157-168, First available online Mar. 15, 2022.

Z.M. Omara, et al., "A review of solar still performance with reflectors", Renewable and Sustainable Energy Reviews, vol. 68, Part 1, pp. 638-649. First available online Oct. 28, 2016.

* cited by examiner

WATER DESALINATION BY USING COMPACT AND PORTABLE SOLAR STILL WITH HIGH EFFICIENCY

FIELD AND BACKGROUND

The disclosure of the present application relates to a water desalination system, and particularly to a system and a method for desalinating saline or brackish water.

DESCRIPTION OF THE PRIOR ART

In many parts of the world, the availability of fresh water is a problem that is getting more and more serious. Fresh water supplies are being depleted and polluted as a result of rising global industrial and agricultural activities as well as rising world population. Certain countries are projected to face severe water stress level (ratio of water withdrawal to water supply) in the year 2040. Even though it makes up three-quarters of the planet's surface and is a plentiful natural resource, only around 3% of all water sources are potable.

Arid and remote areas rely on groundwater for drinking purposes. Potable water is extremely limited in desert regions, thus finding a way to make it accessible is crucial to the development of a human habitat there. Salinity levels in certain water may be too high to qualify as fresh drinking water. The level of saltiness in brackish water is affected by location around the world. In these situations, fresh water must be either delivered through an expensive and complex water network that costs a lot of money for a tiny population or it must be transported over vast distances.

Renewable energy sources have received a lot of attention recently due to the increasing energy needs around the world as well as environmental concerns. Sun energy is more cost effective than fossil fuels, especially in distant places with low human density, little rainfall, and a lot of sun energy resources.

Solar distillation is a well-known concept for the conversion of seawater into fresh water. Households without access to potable water can simply manufacture the water needed for drinking and cooking using a straightforward solar still when a saltwater source is available. The productivity of a standard solar still in a typical solar desalination process is in a range of about 2-5 L/m$^2$/day, which is significantly lower than that of traditional (i.e., driven by electricity and/or fossil fuels) desalination systems. Consequently, it would be beneficial to be able to maximize the efficiency of solar still.

Thus, a system and a method for desalinating saline or brackish water for solving the aforementioned problems is desired.

SUMMARY

The present subject matter relates to a water desalination system which, in one non-limiting embodiment, comprises a water tank configured to store saline or brackish water; a storage tank configured to store distilled water; and a single slope single basin solar still comprising: a basin having a vertically extended back portion, a front portion, a right portion, a left portion, a top portion, and an inner portion, wherein the vertically extended back portion of the basin comprises a first sponge with a first plurality of stainless steel coated metal objects inserted therein, and the inner portion of the basin comprises a second sponge with a second plurality of stainless steel coated metal objects inserted therein; a wooden frame having a vertical extended back section unitarily connected to a receptacle, wherein the vertical extended back section of the wooden frame comprises a top region having a longitudinal slot extending therefrom to a bottom region of the vertical extended back section of the wooden frame, and the receptacle comprises a front section, a right section, a left section, a top section, and an inner section; an insulation located within the longitudinal slot of the top region of the wooden frame and between the basin and the receptacle when the basin is received within the inner section of the receptacle, wherein the insulation is configured to insulate the basin; a serpentine pipe attached to a rear region of the vertical extended back section of the wooden frame, wherein the serpentine pipe comprises an inlet and an outlet, the serpentine pipe inlet is connected to the water tank via a piping connection and the serpentine pipe inlet is configured to receive the saline or brackish water from the water tank, and the serpentine pipe outlet is connected to the inner portion of the basin; a glass cover removably fixed to the top region of the vertical extended back section of the wooden frame to enclose the vertically extended back portion and the top portion of the basin, wherein the glass cover is configured to allow incident solar radiation to pass therethrough; a plurality of troughs located adjacent to the top portion of the basin configured to receive distilled water in the form of condensed water vapor on the glass cover; a distilled water piping located at a portion of the front section of the receptacle, wherein the distilled water piping comprises an inlet section and an outlet section, the inlet section of the distilled water piping is connected to the plurality of troughs and is configured to receive the distilled water from the plurality of troughs, and the outlet section of the distilled water piping is connected to the storage tank via a conduit pipe configured to send the distilled water to the storage tank; and a plurality of foldable, adjustable reflective mirrors comprising a rear reflective mirror, a front reflective mirror, a right reflective mirror, a left reflective mirror, and a top double sided reflective mirror, wherein the rear reflective mirror is at least hingeably attached to the rear region of the vertical extended back section of the wooden frame, the front reflective mirror is at least hingeably attached to the front section of the receptacle, the right reflective mirror is at least hingeably attached to the right section of the receptacle, the left reflective mirror is at least hingeably attached to the left section of the receptacle, and the top double sided reflective mirror is hingeably attached to the top region of the vertical extended back section of the wooden frame.

In an embodiment, the glass cover comprises a front surface, left surface, and a right surface and the front surface of the glass cover has an inclined angle of 26°.

In another embodiment, the first plurality of stainless steel coated metal objects comprises different geometries and are welded to the vertically extended back portion of the basin.

In another embodiment, the first plurality of stainless steel coated metal objects comprises different geometries and are welded to the vertically extended back portion of the basin.

In a further embodiment, the first plurality of stainless steel coated metal objects and the second plurality of stainless steel coated metal objects have different geometries from each other.

In an embodiment, the insulation is red sand comprising about 90% silica and has a thermal conductivity of about 0.2 W/mK.

In an embodiment, each of the rear reflective mirror, the front reflective mirror, the right reflective mirror, and the left reflective mirror have a front side and a back side, all of the front sides of the rear reflective mirror, the front reflective mirror, the right reflective mirror, and the left reflective mirror face toward the single slope single basin solar still, and all of the back sides of the rear reflective mirror, the front reflective mirror, the right reflective mirror, and the left reflective mirror have insulation and face away from the single slope single basin solar still.

In some embodiments, the inner portion of the basin further comprises a bottom portion, an inner right portion, an inner left portion, and an inner front portion, wherein the bottom portion, the inner right portion, the inner left portion, and the inner front portion are coated with a black fiber reinforced plastic configured to leakproof the basin.

In some embodiments, the second sponge is located on the bottom portion of the basin, and the inner right portion, the inner left portion, and the inner front portion of the basin contain a third sponge with a third plurality of stainless steel coated metal objects inserted therein.

In some embodiments, the first plurality of stainless steel coated metal objects, the second plurality of stainless steel coated metal objects, and the third plurality of stainless steel coated metal objects are configured to absorb the incident solar radiation resulting in raising a temperature inside the basin.

In some embodiments, the rear reflective mirror is configured to reflect the incident solar radiation onto the serpentine pipe to preheat the saline or brackish water therein.

In certain embodiments, the top double sided reflective mirror comprises a front segment and a rear segment, wherein the rear segment of the top double sided reflective mirror is configured to reflect the incident solar radiation onto the water tank to preheat the saline or brackish water therein, and the front segment of the top double sided reflective mirror is configured to reflect the incident solar radiation through the glass cover.

In other embodiments, the front reflective mirror, the right reflective mirror, and the left reflective mirror are configured to reflect the incident solar radiation through the glass cover.

In additional embodiments, the rear reflective mirror, the front reflective mirror, the right reflective mirror, the left reflective mirror, and the top double sided reflective mirror are heliostat mirrors with a high reflectance of 90%.

In another embodiment, the basin is made of galvanized iron sheet with a thickness of 1.5 mm and a thermal conductivity of 52 W/mK.

In a further embodiment, the present subject matter relates to a method of using the water desalination system described above for desalinating the saline or the brackish water, the method comprising: supplying the saline or the brackish water to the water tank; flowing the saline or the brackish water from the water tank to the inlet of the serpentine pipe via the piping connection; filling the inner portion of the basin with the saline or the brackish water via the serpentine pipe outlet to saturate the second sponge with the saline or the brackish water; adjusting the rear reflective mirror, the front reflective mirror, the right reflective mirror, the left reflective mirror, and the top double sided reflective mirror of the single slope single basin solar still to maximize reflection of the incident solar radiation; wherein the rear reflective mirror is adjusted to reflect the incident solar radiation onto the serpentine pipe to preheat the saline or the brackish water therein, the front reflective mirror is adjusted to reflect the incident solar radiation through a front surface of the glass cover having an inclined angle of 26° to raise a temperature inside the basin, the right reflective mirror is adjusted to reflect the incident solar radiation through a right surface of the glass cover to raise the temperature inside the basin, the left reflective mirror is adjusted to reflect the incident solar radiation through a left surface of the glass cover to raise the temperature inside the basin, and the top double sided reflective mirror is adjusted to reflect the incident solar radiation through the front surface of the glass cover and onto the water tank to raise the temperature inside the basin and to preheat the saline or the brackish water therein respectively, wherein the temperature rise inside the basin causes the saline or the brackish water to become heated and vaporized into water vapor; condensing the water vapor to form distilled water droplets on an inner surface of the glass cover which is at a lower temperature than the inside of the basin, wherein the distilled water droplets run down on the inner surface of the glass cover into the plurality of troughs to be collected as distilled water; and flowing the distilled water from the plurality of troughs to the storage tank via the distilled water piping and the conduit pipe.

In an embodiment, the second sponge is a floating, black-colored sponge which absorbs the incident solar radiation as heat as the incident solar radiation is directed toward the inner portion of the basin.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
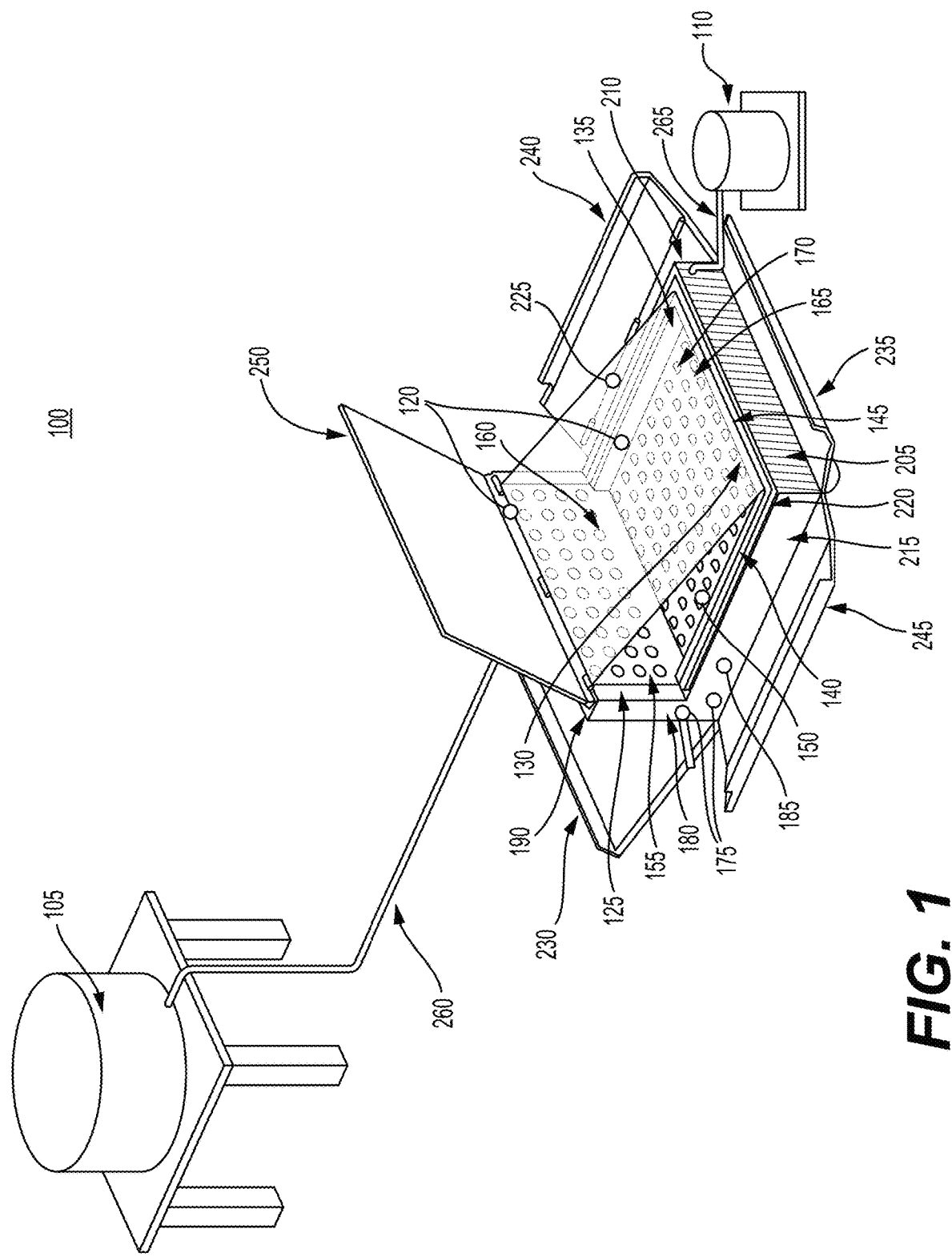
FIG. 1 depicts an overall view of a water desalination system which includes a water tank, a storage tank, and a single slope single basin solar still. Also shown in the figure is a rear reflective mirror, a front reflective mirror, a right reflective mirror, a left reflective mirror, and a top double sided reflective mirror in an open position.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Various parameters affect both efficiency and productivity of a solar still. Some of these parameters are the overall design of the solar still, the depth of the water in the solar still, the salt content in the water source, the location where the water source is located, the type of absorbing materials used in the solar still, and the evaporation method use for the solar still. All these parameters can be changed to increase the rate at which distilled water is produced in the solar still.

Numerous geometric designs have been introduced in solar stills by various individuals over the past three decades to increase the efficiency of solar still production and thereby increasing the productivity of distilled water or fresh water from seawater. However, higher efficiency concepts suffer from higher costs and difficult installation. As a result, they become economically unattractive and therefore uncompetitive. Single slope single basin solar still is one of the most famous solar still types. Numerous research papers are devoted to the problem of enhancing the productivity, effectiveness, and efficiency of the single slope single basin solar stills.

Figure 2:
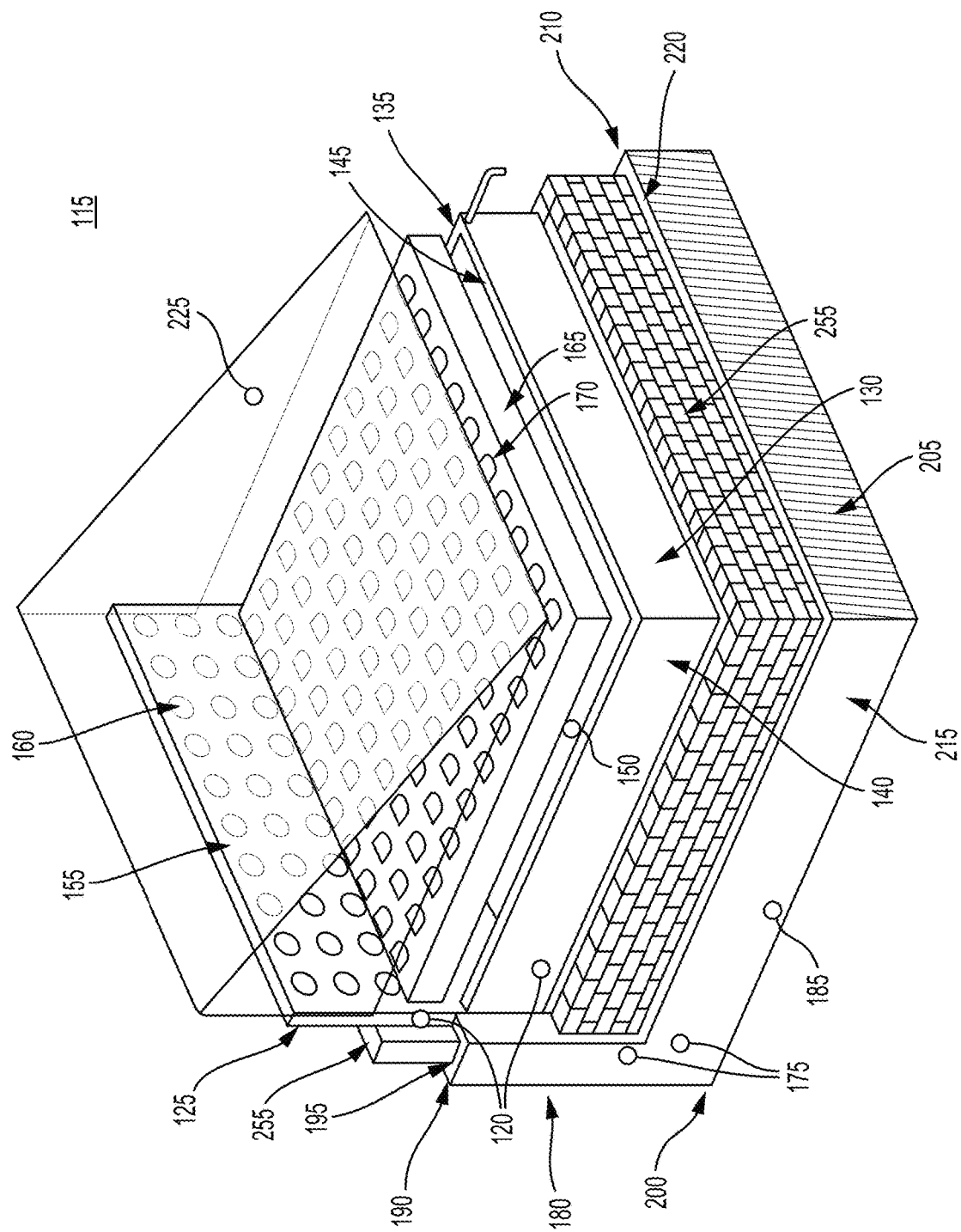
FIG. 2 depicts an exploded view of the single slope single basin solar still without the rear reflective mirror, the front reflective mirror, the right reflective mirror, the left reflective mirror, and the top double sided reflective mirror.

FIGS. 1-2 depict a view of a water desalination system (100) which includes a water tank (105) for storing saline or brackish water, a storage tank (110) for storing distilled water, and a single slope single basin solar still (115) for desalinating the saline or the brackish water. In an embodiment, the saline water is seawater. The single slope single basin solar still (115) includes a basin (120) having a vertically extended back portion (125), a front portion (130), a right portion (135), a left portion (140), a top portion (145), and an inner portion (150). In a non-limiting embodiment, the basin (120) is made of galvanized iron sheet with a thickness of 1.5 mm and a thermal conductivity of 52 W/mK. In some non-limiting embodiments, the basin (120) has a length of 100 mm, a width of 100 mm, and a maximum height of 80 mm. The vertically extended back portion (125) of the basin (120) includes a first sponge (155) with a first plurality of stainless steel coated metal objects (160)

inserted therein. In certain embodiments, the first plurality of stainless steel coated metal objects (160) can have different geometries and are welded to the vertically extended back portion (125) of the basin (120). In some other embodiments, the first plurality of stainless steel coated metal objects (160) are welded to the vertically extended back portion (125) of the basin (120) above a water level in the basin (120). In a particular non-limiting embodiment, the water level in the basin (120) is kept at 15 mm high at all times.

The inner portion (150) of the basin (120) includes a second sponge (165) with a second plurality of stainless steel coated metal objects (170) inserted therein. In some non-limiting embodiments, the second sponge (165) is a floating, black-colored sponge which absorbs the incident solar radiation as heat as the incident solar radiation is directed toward the inner portion (150) of the basin (120). In certain embodiments, the second sponge (165) is 10 mm thick having same dimensions as the basin (120). In an embodiment, the first plurality of stainless steel coated metal objects (160) and the second plurality of stainless steel coated metal objects (170) can have different geometries from each other.

The single slope single basin solar still (115) also includes a wooden frame (175) having a vertical extended back section (180) unitarily connected to a receptacle (185). In an embodiment, the wooden frame (175) is made of teakwood with a thermal conductivity of about 0.045 W/mK and a thickness of 16 mm. The vertical extended back section (180) of the wooden frame (175) includes a top region (190) having a longitudinal slot (195) extending therefrom to a bottom region (200) of the vertical extended back section (180) of the wooden frame (175). The receptacle (185) has a front section (205), a right section (210), a left section (215), a top section (220), and an inner section (not shown).

The single slope single basin solar still (115) additionally includes a glass cover (225) removably fixed to the top region (190) of the vertical extended back section (180) of the wooden frame (175) to enclose the vertically extended back portion (125) and the top portion (145) of the basin (120). In some embodiments, a rubber gasket strip is between the glass cover (225) and the top region (190) of the vertical extended back section (180) of the wooden frame (175) when the glass cover (225) is removably fixed. In certain embodiments, the glass cover (225) can be removed for cleaning purposes. The glass cover (225) allows incident solar radiation to pass therethrough. In a non-limiting embodiment, the glass cover (225) is 5 mm thick. The glass cover (225) includes a front surface, left surface, and a right surface and the front surface of the glass cover (225) has an inclined angle of 26°. In some embodiments, the second plurality of stainless steel coated metal objects (170) are positioned parallel to the inclined angle of the glass cover (225) within the inner portion (150) of the basin (120) to increase efficiency of absorption of the incident solar radiation.

The single slope single basin solar still (115) further includes a plurality of foldable, adjustable reflective mirrors comprising a rear reflective mirror (230), a front reflective mirror (235), a right reflective mirror (240), a left reflective mirror (245), and a top double sided reflective mirror (250). The rear reflective mirror (230) is at least hingeably attached to a rear region of the vertical extended back section (180) of the wooden frame (175). The front reflective mirror (235) is at least hingeably attached to the front section (205) of the receptacle (185). The right reflective mirror (240) is at least hingeably attached to the right section (210) of the receptacle (185). The left reflective mirror (245) is at least hingeably attached to the left section (215) of the receptacle (185). The top double sided reflective mirror (250) is hingeably attached to the top region (190) of the vertical extended back section (180) of the wooden frame (175). In an embodiment, the rear reflective mirror (230), the front reflective mirror (235), the right reflective mirror (240), the left reflective mirror (245), and the top double sided reflective mirror (250) are heliostat mirrors with a high reflectance of 90%. In some embodiments, the rear reflective mirror (230), the front reflective mirror (235), the right reflective mirror (240), the left reflective mirror (245), and the top double sided reflective mirror (250) are supported with a slotted arrangement for seasonal adjustment which enhances reflection of the incident solar radiation.

The single slope single basin solar still (115) further includes an insulation (255) located within the longitudinal slot (195) of the top region (190) of the wooden frame (175) and between the basin (120) and the receptacle (185) when the basin (120) is received within the inner section (not shown) of the receptacle (185). The insulation (255) insulates the basin (120) and reduces heat loss. The insulation (255) is red sand having about 90% silica and has a thermal conductivity of about 0.2 W/mK. In an embodiment, the red sand can be 50 mm thick. Also shown in FIG. 1 is a piping connection (260) with one end of it connected to the water tank (105). Additionally shown in FIG. 1 is a conduit pipe (265) with one end of it connected to the storage tank (110). The single slope single basin solar still (115) is portable, compact, and easy to install and maintain.

Figure 3:
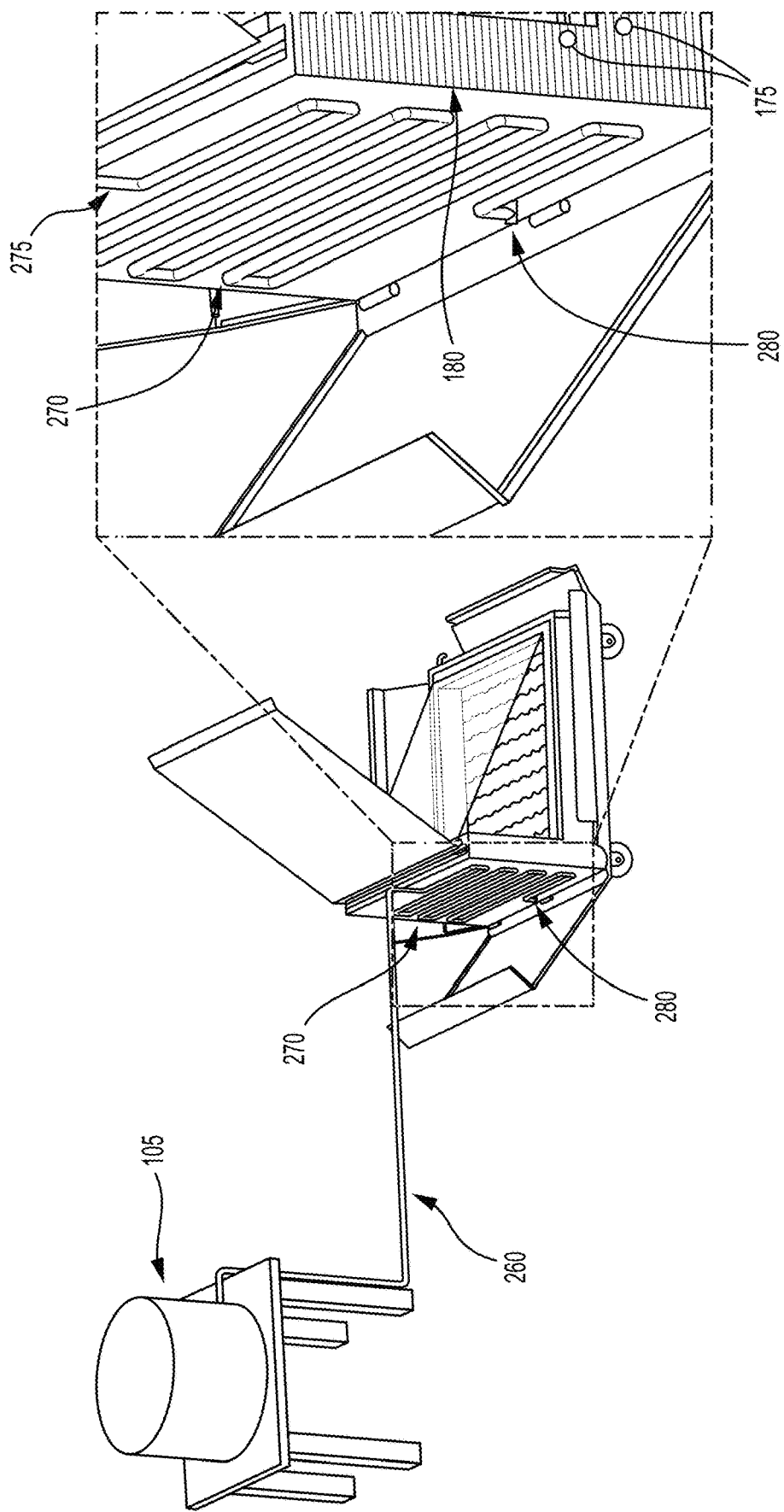
FIG. 3 depicts the single slope single basin solar still with a serpentine pipe attached to a rear region of a vertical extended back section of a wooden frame. The inlet of serpentine pipe is connected to the water tank via a piping connection. Also shown in the figure are the rear reflective mirror and the front reflective mirror in the open position.

FIG. 3 depicts the single slope single basin solar still (115) which further shows a serpentine pipe (270) attached to a rear region of the vertical extended back section (180) of a wooden frame (175). The serpentine pipe (270) has an inlet (275) and an outlet (280). The serpentine pipe inlet (275) is connected to the water tank (105) via the piping connection (260). The serpentine pipe inlet (275) can receive the saline or the brackish water from the water tank (105). The serpentine pipe outlet (280) is connected to the inner portion (150) of the basin (120). The saline or the brackish water from the water tank (105) flows to the serpentine pipe (270) due to the water tank (105) being at a higher elevation than the serpentine pipe (270) and the single slope single basin solar still (115). Thus, external energy is not needed to create the flow.

Figure 4:
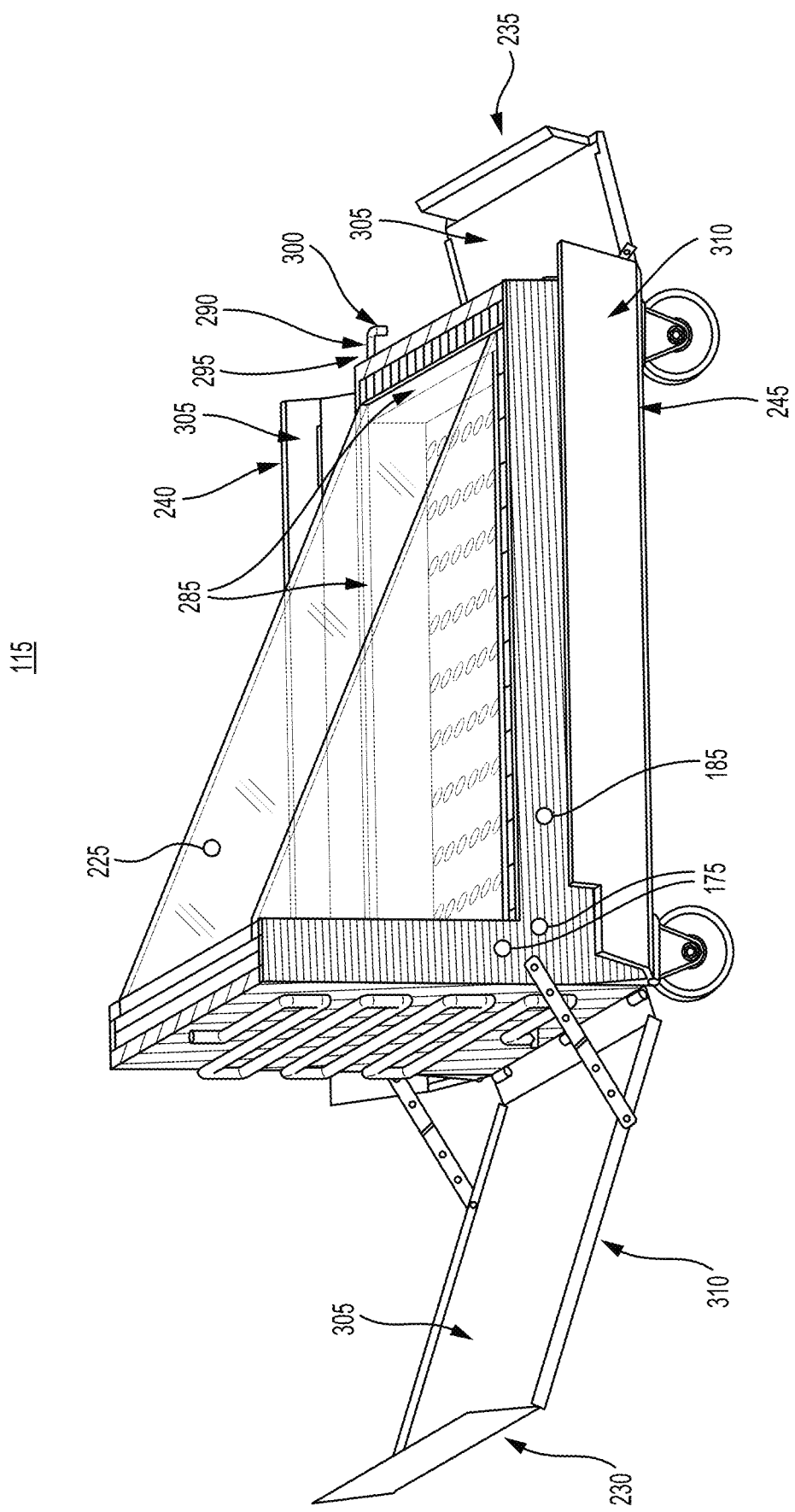
FIG. 4 depicts an isometric view of the single slope single basin solar still having a plurality of troughs connected to a distilled water piping.

FIG. 4 depicts an isometric view of the single slope single basin solar still (115) which further includes a plurality of troughs (285) located adjacent to the top portion (145) of the basin (120). The plurality of troughs (285) can receive distilled water in the form of condensed water vapor on the glass cover (225). The single slope single basin solar still (115) further includes a distilled water piping (290) located at a portion of the front section (195) of the receptacle (185). The distilled water piping (290) has an inlet section (295) and an outlet section (300). The inlet section (295) of the distilled water piping (290) is connected to the plurality of troughs (285). The inlet section (295) of the distilled water piping (290) can receive the distilled water from the plurality of troughs (285). The outlet section (300) of the distilled water piping (290) is connected to the storage tank (110) via the conduit pipe (265). The outlet section (300) of the distilled water piping (290) can send the distilled water to the storage tank (110).

Also shown in FIG. 4, each of the rear reflective mirror (230), the front reflective mirror (235), the right reflective mirror (240), and the left reflective mirror (245) have a front side (305) and a back side (310). All of the front sides (305)

of the rear reflective mirror (230), the front reflective mirror (235), the right reflective mirror (240), and the left reflective mirror (245) face toward the single slope single basin solar still (115). All of the back sides (310) of the rear reflective mirror (230), the front reflective mirror (235), the right reflective mirror (240), and the left reflective mirror (245) have insulation (not shown) and face away from the single slope single basin solar still (115). The insulation on the back sides (310) of the rear reflective mirror (230), the front reflective mirror (235), the right reflective mirror (240), and the left reflective mirror (245) helps to store solar energy from the incident solar radiation with very minimal heat loss within the basin (120) and allows the single slope single basin solar still (115) to operate at night thereby increasing water distillation productivity. Thus, the supplied saline or the brackish water within the basin (120) can remain hot at night.

Figure 5:
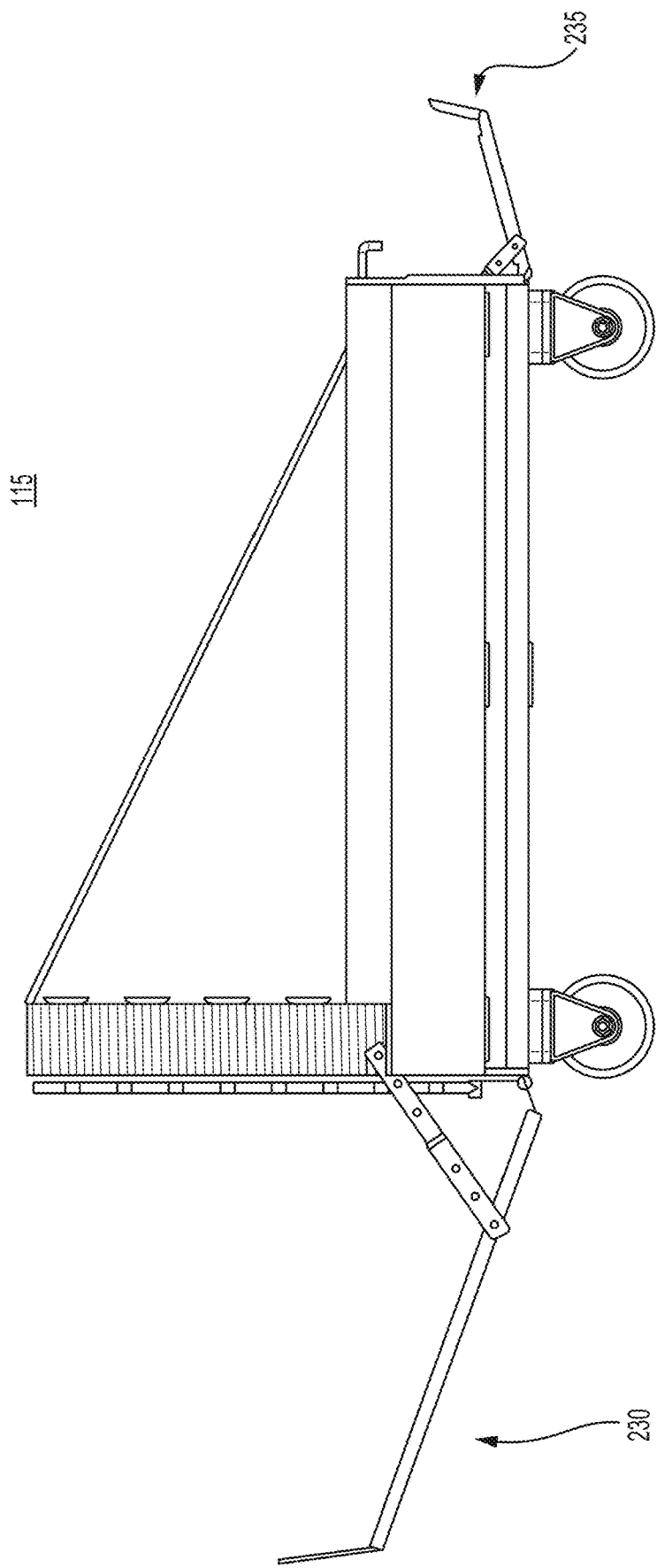
FIG. 5 depicts a side view of the single slope single basin solar still with the rear reflective mirror and the front reflective mirror in the open position.

FIG. 5 depicts a side view of the single slope single basin solar still (115) with the rear reflective mirror (230) and the front reflective mirror (235) in the open position.

Figure 6:
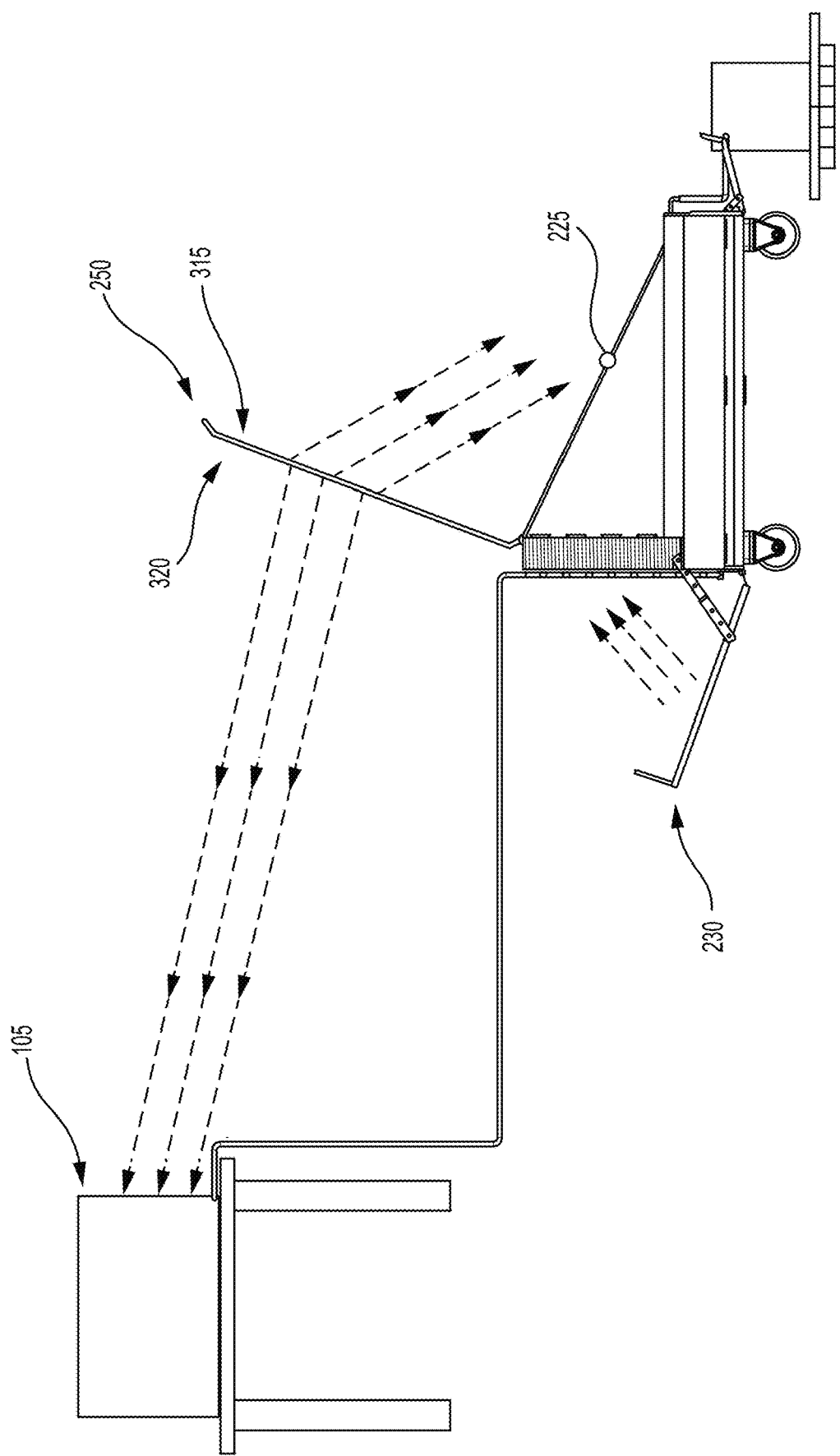
FIG. 6 depicts the water desalination system with the top double sided reflective mirror reflecting an incident solar radiation onto a water tank and through a glass cover. Also shown in the figure is the rear reflective mirror reflecting the incident solar radiation onto the serpentine pipe.

FIG. 6 depicts the water desalination system (100) which includes the top double sided reflective mirror (250) having a front segment (315) and a rear segment (320). The rear segment (320) of the top double sided reflective mirror (250) can reflect the incident solar radiation onto the water tank (105) to preheat the saline or the brackish water therein. The front segment (315) of the top double sided reflective mirror (250) can reflect the incident solar radiation through the glass cover (225). Also shown in the figure is the rear reflective mirror (230) which can reflect the incident solar radiation onto the serpentine pipe (270) to preheat the saline or the brackish water therein.

Figure 7:
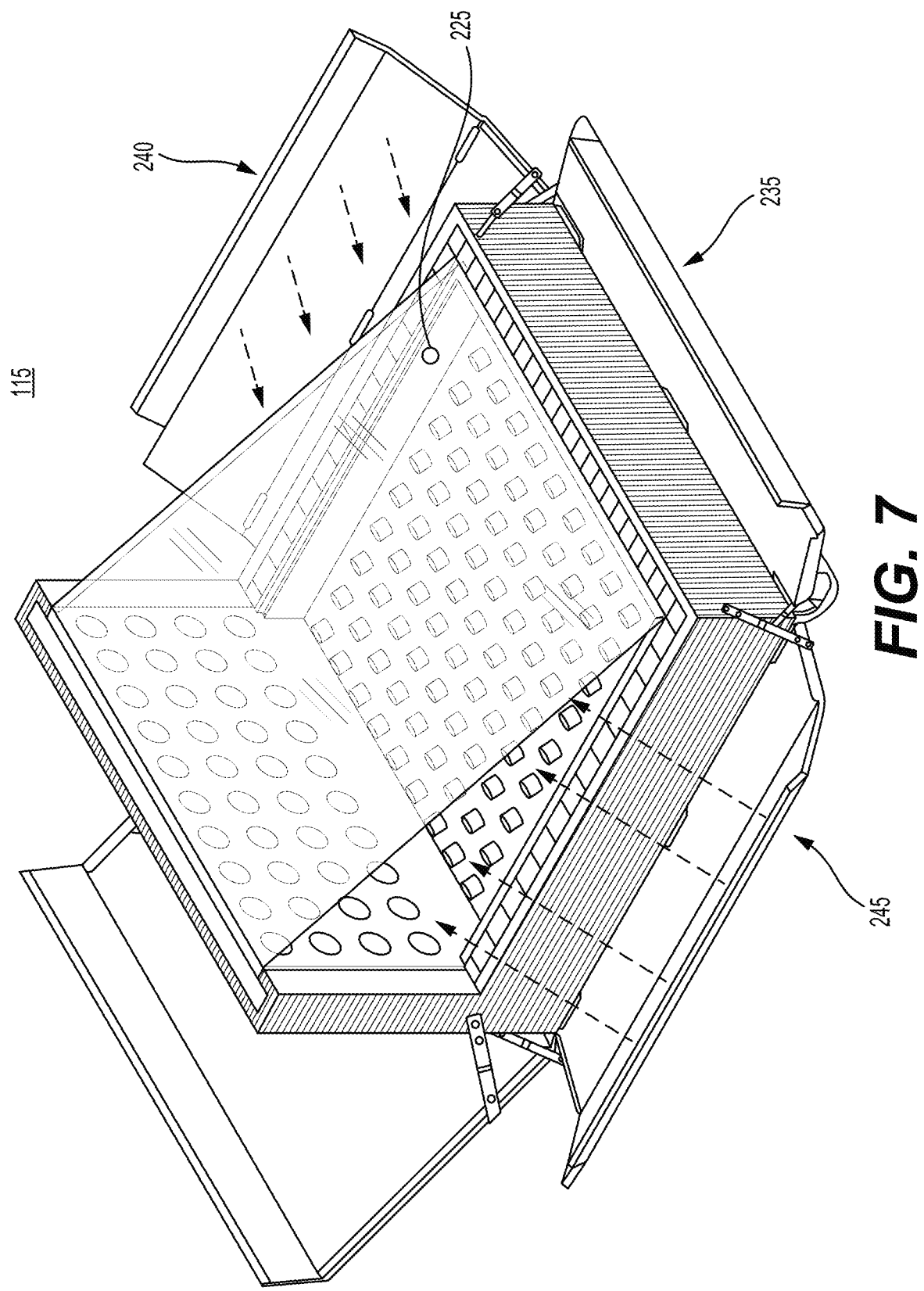
FIG. 7 depicts the single slope single basin solar still with the incident solar radiation reflecting from the front reflective mirror, the right reflective mirror, and the left reflective mirror through the glass cover.

FIG. 7 depicts the single slope single basin solar still (115) with the incident solar radiation reflecting from the front reflective mirror (235), the right reflective mirror (240), and the left reflective mirror (245) through the glass cover (225).

Figure 8:
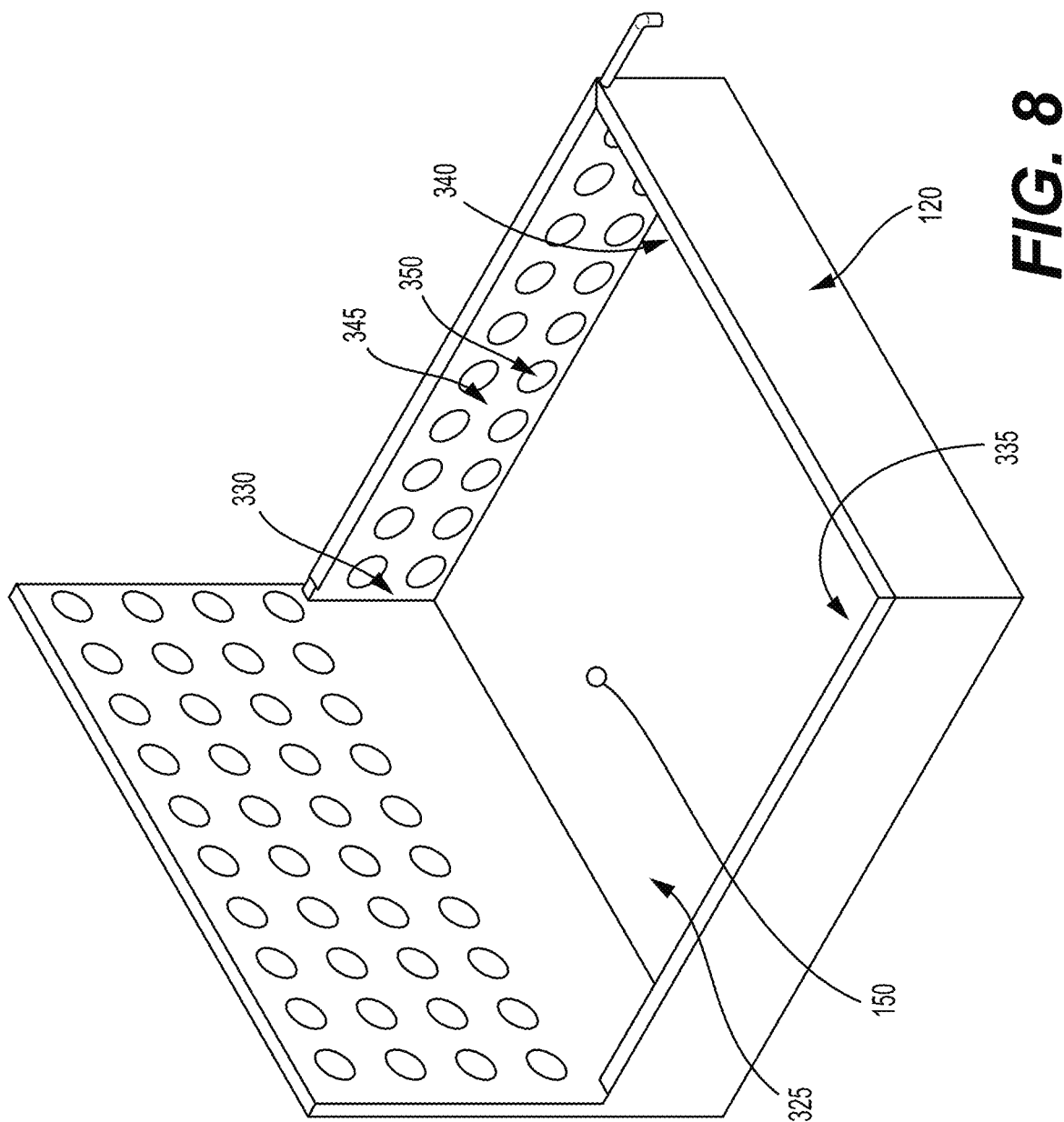
FIG. 8 depicts details of an inner portion of a basin of the single slope single basin solar still.

FIG. 8 depicts details of the inner portion (150) of the basin (120) of the single slope single basin solar still (115). The inner portion (150) of the basin (120) further includes a bottom portion (325), an inner right portion (330), an inner left portion (335), and an inner front portion (340). The bottom portion (325), the inner right portion (330), the inner left portion (335), and the inner front portion (340) are coated with a plastic to leakproof the basin (120). The plastic has a capacity to absorb 80% of the incident solar radiation and minimize reflection of the incident solar radiation. In a non-limiting embodiment, the plastic is a black fiber reinforced plastic.

The second sponge (165) is located on the bottom portion (325) of the basin (120). The inner right portion (330), the inner left portion (335), and the inner front portion (340) of the basin (120) contain a third sponge (345) with a third plurality of stainless steel coated metal objects (350) inserted therein. The first plurality of stainless steel coated metal objects (160), the second plurality of stainless steel coated metal objects (170), and the third plurality of stainless steel coated metal objects (350) can absorb the incident solar radiation resulting in raising a temperature inside the basin (120).

Figure 9:
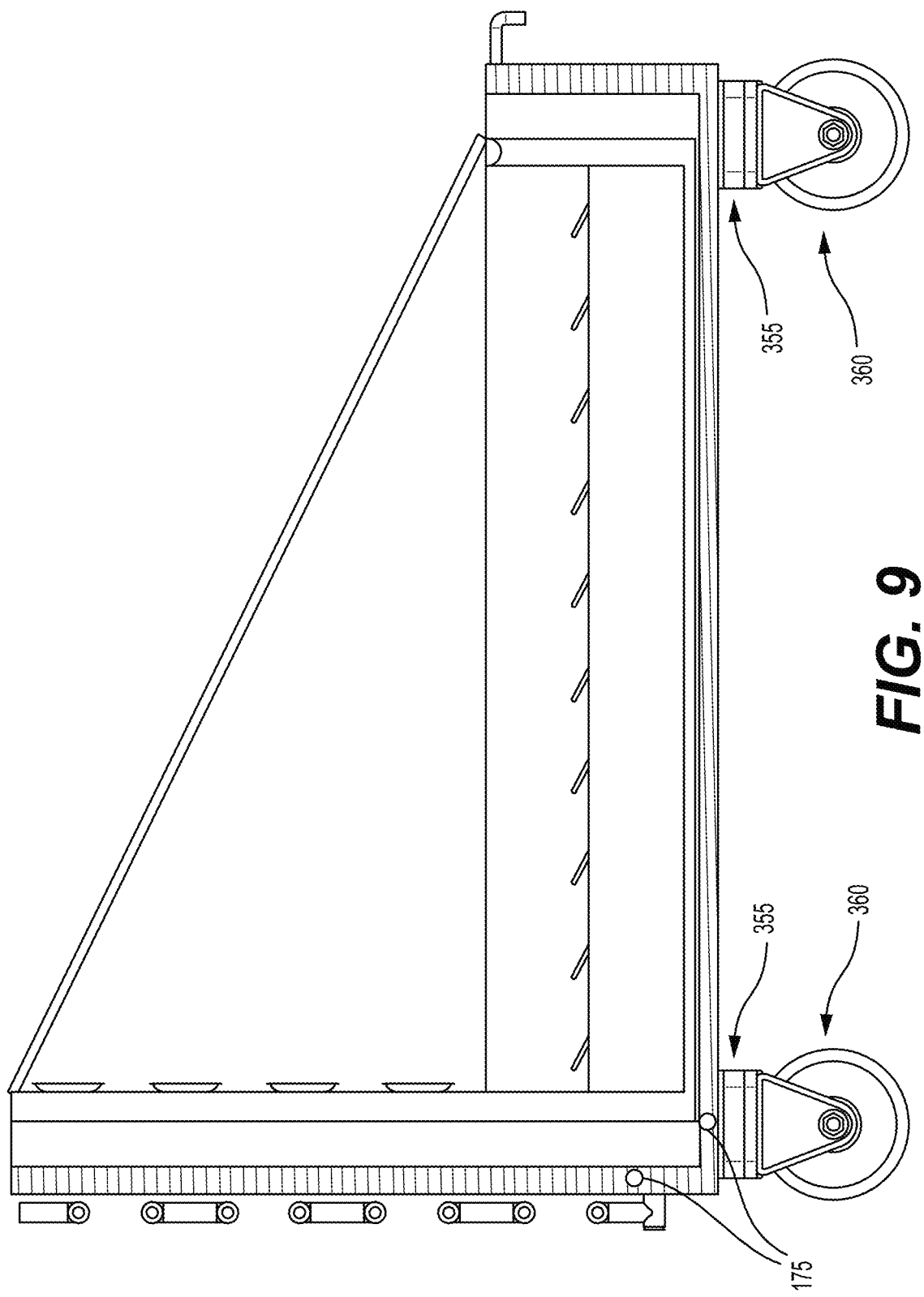
FIG. 9 depicts a cross-section view of the single slope single basin solar still on a vertical supporting system with wheels.

FIG. 9 depicts a cross-section view of the single slope single basin solar still (115) with the wooden frame (175) situated on a vertical supporting system (355) with castor wheels (360) attached thereto.

Figure 10:
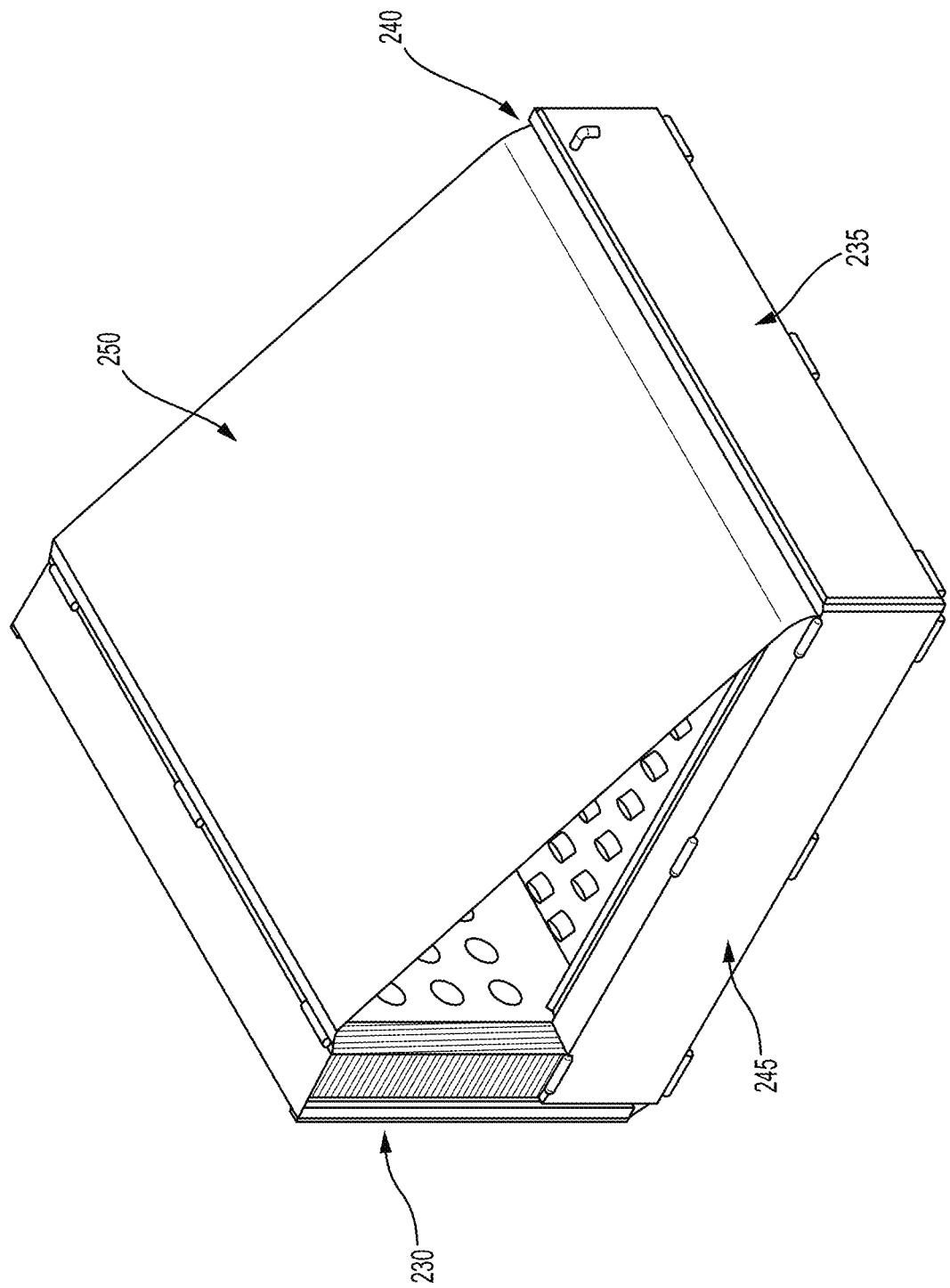
FIG. 10 depicts a 3D view of the single slope single basin solar still with the rear reflective mirror, the front reflective mirror, the right reflective mirror, the left reflective mirror, and the top double sided reflective mirror in a folded position.

FIG. 10 depicts a 3D view of the single slope single basin solar still (115) with the rear reflective mirror (230), the front reflective mirror (235), the right reflective mirror (240), the left reflective mirror (245), and the top double sided reflective mirror (250) in a folded position.

Figure 11:
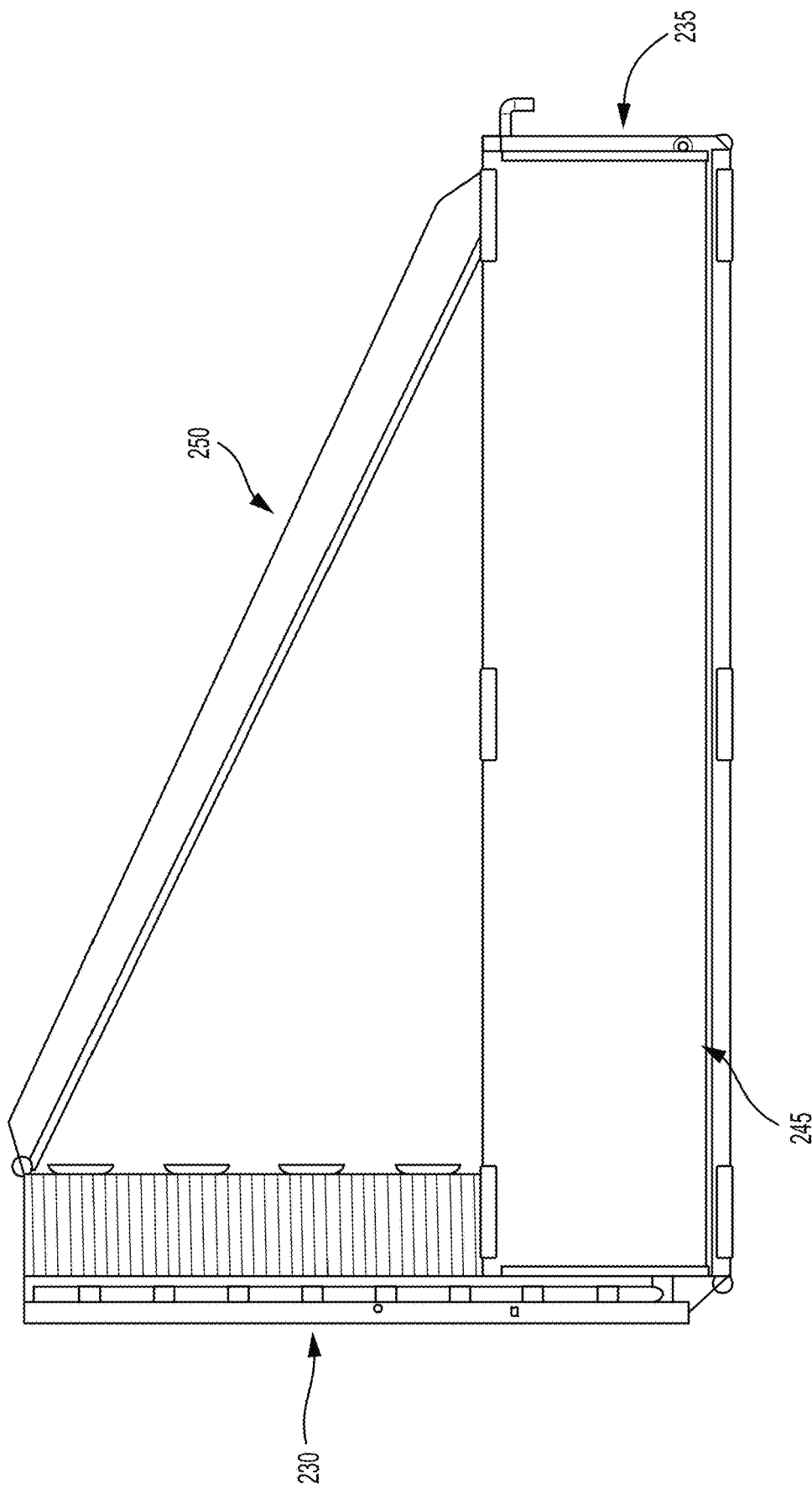
FIG. 11 depicts a side view of the single slope single basin solar still with the rear reflective mirror, the front reflective mirror, the left reflective mirror, and the top double sided reflective mirror in the folded position.

FIG. 11 depicts a side view of the single slope single basin solar still (115) with the rear reflective mirror (230), the front reflective mirror (235), the left reflective mirror (245), and the top double sided reflective mirror (250) in a folded position.

The present subject matter also relates to a method of using the water desalination system (100) for desalinating the saline or the brackish water. The present method includes supplying the saline or the brackish water to the water tank (105); flowing the saline or the brackish water from the water tank (105) to the inlet (275) of the serpentine pipe (270) via the piping connection (260); filling the inner portion (150) of the basin (120) with the saline or the brackish water via the serpentine pipe outlet (280) to saturate the second sponge (165) with the saline or the brackish water; and adjusting the rear reflective mirror (230), the front reflective mirror (235), the right reflective mirror (240), the left reflective mirror (245), and the top double sided reflective mirror (250) of the single slope single basin solar still (115) to maximize reflection of the incident solar radiation. The rear reflective mirror (230) is adjusted to reflect the incident solar radiation onto the serpentine pipe (270) to preheat the saline or the brackish water therein. The front reflective mirror (235) is adjusted to reflect the incident solar radiation through the front surface of the glass cover (225) having an inclined angle of 26° to raise a temperature inside the basin (120). The right reflective mirror (240) is adjusted to reflect the incident solar radiation through a right surface of the glass cover (225) to raise the temperature inside the basin (120). The left reflective mirror (245) is adjusted to reflect the incident solar radiation through a left surface of the glass cover (225) to raise the temperature inside the basin (120). The top double sided reflective mirror (250) is adjusted to reflect the incident solar radiation through the front surface of the glass cover (225) and onto the water tank (105) to raise the temperature inside the basin (120) and to preheat the saline or the brackish water therein respectively. The temperature rise inside the basin (120) causes the saline or the brackish water to become heated and vaporized into water vapor. The method includes condensing the water vapor to form distilled water droplets on an inner surface of the glass cover (225) which is at a lower temperature than the inside of the basin (120), and the distilled water droplets run down on the inner surface of the glass cover (225) into the plurality of troughs (285) to be collected as distilled water. The distilled water flows from the plurality of troughs (285) to the storage tank (110) via the distilled water piping (290) and the conduit pipe (265).

It is to be understood that the present processes, compositions, and methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A water desalination system, comprising:
a water tank configured to store saline or brackish water;
a storage tank configured to store distilled water; and
a single slope single basin solar still comprising:
a basin having a vertically extended back portion,
a front portion,
a right portion,
a left portion, a top portion, and
an inner portion,
wherein the vertically extended back portion of the basin comprises a first sponge with a first plurality of stainless steel coated metal objects inserted therein, and the inner portion of the basin comprises a second sponge with a second plurality of stainless steel coated metal objects inserted therein;
a wooden frame having a vertical extended back section unitarily connected to a receptacle, wherein the vertical extended back section of the wooden frame comprises a top region having a longitudinal slot extending therefrom to a bottom region of the vertical extended back section of the wooden frame, and the receptacle comprises a front section, a right section, a left section, a top section, and an inner section;
an insulation located within the longitudinal slot of the top region of the wooden frame and between the basin and the receptacle when the basin is received within the inner section of the receptacle, wherein the insulation is configured to insulate the basin;
a serpentine pipe attached to a rear region of the vertical extended back section of the wooden frame, wherein the serpentine pipe comprises an inlet and an outlet, the serpentine pipe inlet is connected to the water tank via a piping connection and the serpentine pipe inlet is configured to receive the saline or brackish water from the water tank, and the serpentine pipe outlet is connected to the inner portion of the basin;
a glass cover removably fixed to the top region of the vertical extended back section of the wooden frame to enclose the vertically extended back portion and the top portion of the basin, wherein the glass cover is configured to allow incident solar radiation to pass therethrough;
a plurality of troughs located adjacent to the top portion of the basin configured to receive distilled water in the form of condensed water vapor on the glass cover;
a distilled water piping located at a portion of the front section of the receptacle, wherein the distilled water piping comprises an inlet section and an outlet section, the inlet section of the distilled water piping is connected to the plurality of troughs and is configured to receive the distilled water from the plurality of troughs, and the outlet section of the distilled water piping is connected to the storage tank via a conduit pipe configured to send the distilled water to the storage tank; and
a plurality of foldable, adjustable reflective mirrors comprising a rear reflective mirror, a front reflective mirror, a right reflective mirror, a left reflective mirror, and a top double sided reflective mirror, wherein the rear reflective mirror is at least hingeably attached to the rear region of the vertical extended back section of the wooden frame, the front reflective mirror is at least hingeably attached to the front section of the receptacle, the right reflective mirror is at least hingeably attached to the right section of the receptacle, the left reflective mirror is at least hingeably attached to the left section of the receptacle, and the top double sided reflective mirror is hingeably attached to the top region of the vertical extended back section of the wooden frame.

2. The water desalination system of claim 1, wherein the glass cover comprises a front surface, a left surface, and a right surface and the front surface of the glass cover has an inclined angle of 26°.

3. The water desalination system of claim 1, wherein the first plurality of stainless steel coated metal objects comprises different geometries and are welded to the vertically extended back portion of the basin.

4. The water desalination system of claim 1, wherein the first plurality of stainless steel coated metal objects and the second plurality of stainless steel coated metal objects have different geometries from each other.

5. The water desalination system of claim 1, wherein the insulation is red sand comprising about 90% silica and has a thermal conductivity of about 0.2 W/mK.

6. The water desalination system of claim 1, wherein each of the rear reflective mirror, the front reflective mirror, the right reflective mirror, and the left reflective mirror have a front side and a back side, all of the front sides of the rear reflective mirror, the front reflective mirror, the right reflective mirror, and the left reflective mirror face toward the single slope single basin solar still, and all of the back sides of the rear reflective mirror, the front reflective mirror, the right reflective mirror, and the left reflective mirror have insulation and face away from the single slope single basin solar still.

7. The water desalination system of claim 1, wherein the inner portion of the basin further comprises a bottom portion, an inner right portion, an inner left portion, and an inner front portion, wherein the bottom portion, the inner right portion, the inner left portion, and the inner front portion are coated with a black fiber reinforced plastic configured to leakproof the basin.

8. The water desalination system of claim 7, wherein the second sponge is located on the bottom portion of the basin; and wherein the inner right portion, the inner left portion, and the inner front portion of the basin contain a third sponge with a third plurality of stainless steel coated metal objects inserted therein.

9. The water desalination system of claim 8, wherein the first plurality of stainless steel coated metal objects, the second plurality of stainless steel coated metal objects, and the third plurality of stainless steel coated metal objects are configured to absorb the incident solar radiation resulting in raising a temperature inside the basin.

10. The water desalination system of claim 1, wherein the rear reflective mirror is configured to reflect the incident solar radiation onto the serpentine pipe to preheat the saline or brackish water therein.

11. The water desalination system of claim 1, wherein the top double sided reflective mirror comprises a front segment and a rear segment, wherein the rear segment of the top double sided reflective mirror is configured to reflect the incident solar radiation onto the water tank to preheat the saline or brackish water therein, and the front segment of the top double sided reflective mirror is configured to reflect the incident solar radiation through the glass cover.

12. The water desalination system of claim 1, wherein the front reflective mirror, the right reflective mirror, and the left reflective mirror are configured to reflect the incident solar radiation through the glass cover.

13. The water desalination system of claim 1, wherein the rear reflective mirror, the front reflective mirror, the right reflective mirror, the left reflective mirror, and the top double sided reflective mirror are heliostat mirrors with a high reflectance of 90%.

14. The water desalination system of claim 1, wherein the basin is made of galvanized iron sheet with a thickness of 1.5 mm and a thermal conductivity of 52 W/mK.

15. A method of using the water desalination system of claim 1 for desalinating the saline or the brackish water, the method comprising:
supplying the saline or the brackish water to the water tank;
flowing the saline or the brackish water from the water tank to the inlet of the serpentine pipe via the piping connection;
filling the inner portion of the basin with the saline or the brackish water via the serpentine pipe outlet to saturate the second sponge with the saline or the brackish water;
adjusting the rear reflective mirror, the front reflective mirror, the right reflective mirror, the left reflective mirror, and the top double sided reflective mirror of the single slope single basin solar still to maximize reflection of the incident solar radiation; wherein the rear reflective mirror is adjusted to reflect the incident solar radiation onto the serpentine pipe to preheat the saline or the brackish water therein, the front reflective mirror is adjusted to reflect the incident solar radiation through a front surface of the glass cover having an inclined angle of 26° to raise a temperature inside the basin, the right reflective mirror is adjusted to reflect the incident solar radiation through a right surface of the glass cover to raise the temperature inside the basin, the left reflective mirror is adjusted to reflect the incident solar radiation through a left surface of the glass cover to raise the temperature inside the basin, and the top double sided reflective mirror is adjusted to reflect the incident solar radiation through the front surface of the glass cover and onto the water tank to raise the temperature inside the basin and to preheat the saline or the brackish water therein respectively, wherein the temperature rise inside the basin causes the saline or the brackish water to become heated and vaporized into water vapor;
condensing the water vapor to form distilled water droplets on an inner surface of the glass cover which is at a lower temperature than the inside of the basin, wherein the distilled water droplets run down on the inner surface of the glass cover into the plurality of troughs to be collected as distilled water; and
flowing the distilled water from the plurality of troughs to the storage tank via the distilled water piping and the conduit pipe.

16. The method for desalinating the saline or the brackish water of claim 15, wherein the second sponge is a floating, black-colored sponge which absorbs the incident solar radiation as heat as the incident solar radiation is directed toward the inner portion of the basin.

17. The method for desalinating the saline or the brackish water of claim 15, wherein the inner portion of the basin further comprises a bottom portion, an inner right portion, an inner left portion, and an inner front portion, wherein the bottom portion, the inner right portion, the inner left portion, and the inner front portion are coated with a black fiber reinforced plastic to leakproof the basin.

18. The method for desalinating the saline or the brackish water of claim 17, wherein the second sponge is located on the bottom portion of the basin; and wherein the inner right portion, the inner left portion, and the inner front portion of the basin contain a third sponge with a third plurality of stainless steel coated metal objects inserted therein.

19. The method for desalinating the saline or the brackish water of claim 18, wherein the first plurality of stainless steel coated metal objects, the second plurality of stainless steel coated metal objects, and the third plurality of stainless steel coated metal objects absorb the incident solar radiation resulting in further raising the temperature inside the basin.

20. The method of for desalinating the saline or the brackish water of claim 15, wherein the rear reflective mirror, the front reflective mirror, the right reflective mirror, the left reflective mirror, and the top double sided reflective mirror are heliostat mirrors with a high reflectance of 90%.

* * * * *